United States Patent
Ha et al.

(10) Patent No.: US 7,150,011 B2
(45) Date of Patent: Dec. 12, 2006

(54) VIRTUAL HARDWARE MACHINE, METHODS, AND DEVICES

(75) Inventors: Yajun Ha, Hunan (CN); Patrick Schaumont, Wijgmaal (BE); Serge Vernalde, Leuven (BE); Marc Engels, Wijgmaal (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 844 days.

(21) Appl. No.: 09/886,533

(22) Filed: Jun. 20, 2001

(65) Prior Publication Data

US 2002/0059456 A1    May 16, 2002

Related U.S. Application Data

(60) Provisional application No. 60/212,906, filed on Jun. 20, 2000.

(51) Int. Cl.
*G06F 9/44* (2006.01)

(52) U.S. Cl. ............... 717/148; 717/137; 717/139; 717/140

(58) Field of Classification Search ........ 717/118–122, 717/136–153
See application file for complete search history.

(56) References Cited

U.S. PATENT DOCUMENTS

| | | | |
|---|---|---|---|
| 6,477,683 B1 * | 11/2002 | Killian et al. ............. | 716/1 |
| 6,578,020 B1 * | 6/2003 | Nguyen .................... | 706/15 |
| 6,631,508 B1 * | 10/2003 | Williams .................. | 716/8 |
| 6,668,312 B1 * | 12/2003 | Aubury .................... | 711/170 |
| 6,735,761 B1 * | 5/2004 | Ogasawara ............... | 717/140 |
| 6,760,907 B1 * | 7/2004 | Shaylor .................... | 717/158 |

OTHER PUBLICATIONS

European International Search Report. Dated Mar. 1, 2005.
Guccione, Steve, et al., "JBits: Java based interface for reconfigurable computing," presented at the 2nd Annual Military Aerospace Applications of Programmable Devices and Technologies Conference, MAPLD 1999, Sep. 28-30, 1999.
Ha et al., "A Scalable Architecture to Support Networked Reconfiguration," ProRISC 99. 10 19-01:101. 677-83, Nov. 24, 1999.
Ha, Yajun, et al., "Building a Virtual Framework for Networked Reconfigurable Hardware and Software Objects," presented at International Conference on Parallel and Distributed Processing Techniques and Applications 2000, PDPTA 2000, Jun. 24-29, 2000.
Fleischmann et al., "A Hardware/Software Prototyping Environment for Dynamically Reconfigurable Embedded Systems" International Conference on Hardware Software Codesign, Seattle, Washington, Proc. Of the 6th International Workshop on Hardware/Software codesign, pp. 105-109, Mar. 1998.

* cited by examiner

*Primary Examiner*—Tuan Dam
*Assistant Examiner*—Chuck Kendall
(74) *Attorney, Agent, or Firm*—Knobbe, Martens, Olson & Bear, LLP

(57) ABSTRACT

The invention relates to methods and apparatus suitable for executing a service or application at a client peer or client side, having a client specific device or client specific platform, with a reconfigurable architecture, said service or application being provided from a service peer or a service side. In a first aspect of the invention, the method comprises transmitting to the client peer from the server peer an abstract bytecode. The abstract bytecode is generated at the service peer by performing a compilation of an application. The abstract bytecode includes hardware bytecode and software bytecode. At the client peer, the abstract bytecode is transformed into native bytecode for the client specific device.

26 Claims, 14 Drawing Sheets

VIRTUAL HARDWARE MACHINE, METHODS, AND DEVICES

RELATED APPLICATION

This Application claims the benefit of under 35 U.S.C. § 119(e) and incorporates by reference, in its entirety, U.S. application No. 60/212,906, titled "METHOD FOR REALIZING NETWORK RECONFIGURABILITY VIA VIRTUAL HARDWARE MACHINES AND APPARATUS USED THEREFORE", filed Jun. 20, 2000.

FIELD OF THE INVENTION

The invention relates to methods and apparatus suitable for executing a service or application at a client peer or client side, having a client specific device or client specific platform, having a general purpose processor and reconfigurable hardware, both being client specific, said service or application being provided from a service peer or a service side.

BACKGROUND OF THE INVENTION

The invention relates to methods and apparatus suitable for executing a service or application at a client peer or client side, having a client specific device or client specific platform, said service or application being provided from a service peer or a service side.

When considering a plurality of client peers, a large diversity of devices will be encountered, requiring transmittal of client specific descriptions from and at the disposal at said service peer, resulting in a large design effort for designing all said client specific descriptions and storage thereof.

With a service or an application is meant a program, executable on a device and possibly some associated content files. When aiming at a high performance execution or performing of said service, dedicated design of said application such that it utilizes the features of the device, on which it will be executed, is needed. With use of device feature is meant here in particular the possibility of mapping some functions on hardware. Indeed when considering applications with computational intensive functions and computational less intensive functions, it is beneficial for performance to map the computational intensive ones on hardware, if available on the device.

The availability of hardware on which computational intensive functions can be mapped depends on the devices. In particular the existence of hardware reconfigurable devices, such as FPGA's, result in more variability here. Hence the requirement of dedicated design in a client-service environment with a large diversity of devices, in particular hardware reconfigurable ones, results in the need for even more client specific descriptions, especially in a quality of service oriented context. On the other hand said hardware reconfigurability of devices also introduces extra degree's of freedom in designing.

Networked reconfiguration, enabling platform independent application design, is known for software only, with Java Technology as a good representative example. Programming languages such as Java have also been used to describe hardware and even special object classes are defined to provide application programming interfaces to access FPGA bitstreams but these concepts have not been used in platform-independent context.

SUMMARY OF THE INVENTION

The invention relates to methods and apparatus suitable for executing a service or application at a client peer or client side, having a client specific device or client specific platform, with a reconfigurable architecture, said service or application being provided from a service peer or a service side. Said methods and apparatus are such that the amount of specific descriptions, available at the service peer, can be kept small in comparison with the large diversity, including their reconfigurability capacity, of devices found, when considering a plurality of client peers, while still aiming at dedicated device dependent implementations for performance optimization, with a limited effort at the client side. These methods are feasible when a substantial part of the design effort at the service peer is re-usable at the client side. These methods are combinable with networked reconfiguration concepts for software and can benefit from programming languages already having features for describing hardware and even special object classes for providing application programming interfaces to access FPGA bitstreams.

In a first aspect of the invention an overall method for executing at at least one client peer, having a client specific device an application, provided from a service peer is disclosed wherein an abstract bytecode, determined at said service peer by performing a compilation of said application on a virtual device, being at least partly reconfigurable and being representative for a class of devices, is transmitting from said service peer to at least said client peer. Within said method said abstract bytecode is transformed at said client peer into native bytecode for said client specific device, being part of said class of devices and being at least partly reconfigurable by exploiting said native bytecode.

In a first embodiment of this first aspect invention the abstraction level of the communication between the client peer and the service peer is at RTL register transfer level.

In a second embodiment of this first aspect invention the abstraction level of the communication between the client peer and the service peer is at logic level.

In a third embodiment of this first aspect of the invention the use of software means at said client side for generating bitstreams for reconfiguring said reconfigurable part of said client side specific device is presented.

In a fourth embodiment of this first aspect of the invention the concept of a virtual hardware/software interface is introduced.

In a second aspect of the invention a service side method for generating an abstract bytecode bytecode at a service peer for an application, provided from said service peer, said abstract bytecode bytecode being useable for executing said application at at least one client peer, having a reconfigurable client specific device. An abstract bytecode is determined at said service peer by performing a compilation of said application on a virtual device, being at least partly reconfigurable and being representative for a class of reconfigurable devices of which at least said reconfigurable client specific device is part, said abstract bytecode, being transformable into native bytecode for at least said reconfigurable client specific device, said native bytecode containing configuration information for said reconfigurable client specific device/platform.

In a first embodiment of this second aspect invention the abstraction level of the communication between the client peer and the service peer is at RTL register transfer level.

In a second embodiment of this second aspect invention the abstraction level of the communication between the client peer and the service peer is at logic level.

In a third embodiment of this second aspect of the invention the use of software means at said client side for generating bitstreams for reconfiguring said reconfigurable part of said client side specific device is presented.

In a fourth embodiment of this second aspect of the invention the concept of a virtual hardware/software interface is introduced.

In a third aspect of the invention a client side method for executing at at least one client peer, having a client specific device, an application, provided from a service peer, is disclosed. An abstract bytecode, being obtainable by compilation of said application/service on a virtual device, being at least partly reconfigurable, being representative for a class of devices, of which at least said client specific device is part, is transformed at said client peer into native bytecode for said client specific device with transformation software, also denoted a virtual machine. Thereafter said application is executed at said client peer/side on said client specific device, being part of said class of devices and being at least partly reconfigurable by exploiting said native bytecode, said native bytecode containing configuration information for said reconfigurable client specific device.

In a first embodiment of this third aspect invention the abstraction level of the communication between the client peer and the service peer is at RTL register transfer level.

In a second embodiment of this third aspect invention the abstraction level of the communication between the client peer and the service peer is at logic level.

In a third embodiment of this third aspect of the invention the use of software means at said client side for generating bitstreams for reconfiguring said reconfigurable part of said client side specific device is presented.

In a fourth embodiment of this third aspect of the invention the concept of a virtual hardware/software interface is introduced.

In a fourth aspect of the invention a program storage device readable by a client specific device, tangibly embodying a program of instructions executable by said client specific device, to perform steps for executing an application on said client specific device, an application, being provided from a service peer, is disclosed. An abstract bytecode obtained by compilation of said application on a virtual device, being at least partly reconfigurable and being representative for a class of devices, of which at least said client specific device is part, is transformed into native bytecode, partly executable on said client specific device/platform and partly used for configuring said client specific device/platform.

In a first embodiment of this fourth aspect invention the abstraction level of the communication between the client peer and the service peer is at RTL register transfer level.

In a second embodiment of this fourth aspect invention the abstraction level of the communication between the client peer and the service peer is at logic level.

In a third embodiment of this fourth aspect of the invention the use of software means at said client side for generating bitstreams for reconfiguring said reconfigurable part of said client side specific device is presented.

In a fourth embodiment of this fourth aspect of the invention the concept of a virtual hardware/software interface is introduced.

In a fifth aspect of the invention a client specific device comprising a reconfigurable hardware part and means for receiving abstract bytecode, being obtainable by compilation of said application on a virtual device, being at least partly reconfigurable, being representative for a class of devices, of which at least said client specific device is part, means for transforming said abstract bytecode into native bytecode for said client specific device and means for executing said application/service at said client peer on said client specific device, being part of said class of devices and being at least partly reconfigurable by exploiting said native bytecode.

As a summary one can state that the invention can be formalized as a methods for executing applications on hardware reconfigurable devices, by determining a first code by compilation of said application on a virtual device, being at least partly hardware reconfigurable, transmitting said first code to said client, transforming at said client peer said received first code into second code, and reconfiguring said client specific device by exploiting part of said second code; and executing said application at said client peer on said client specific device, by exploiting part of said second code. Said compilation provides information on how said virtual device must be hardware reconfigured for executing said application. Said step of transforming is less demanding than directly determining information from said application on how said client specific device must be hardware reconfigured for executing said application, hence there is a benefit at the client side when one exploits said first code. On the other hand the service side has as advantage that once can concentrate on designing for a single virtual device instead of taking into account client specific issues. Said virtual device is representative for a set of at least two devices, of which at least said client specific device is part.

DETAILED DESCRIPTION OF THE INVENTION

Figure 1:
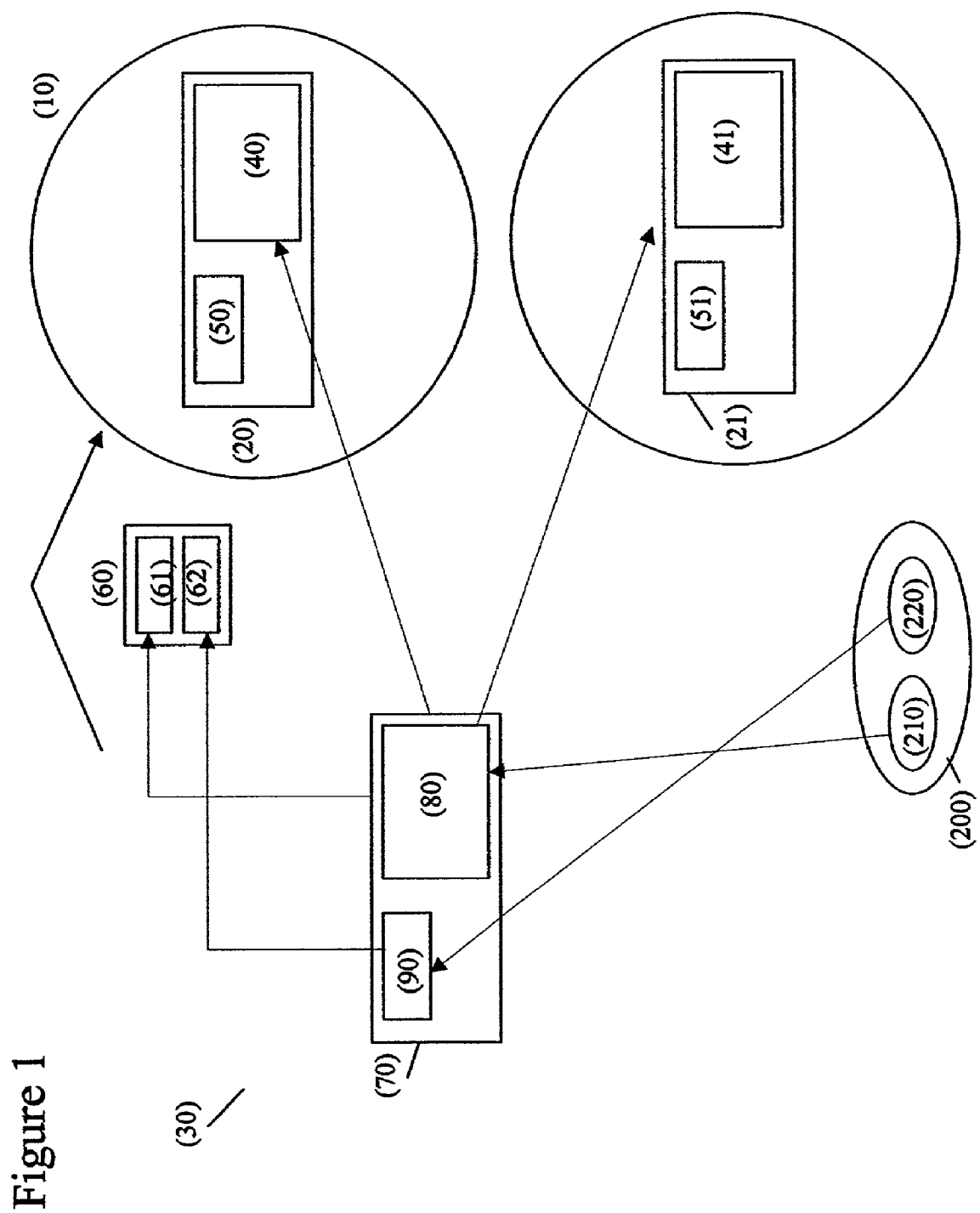
FIG. 1 shows a service peer (30) and a first client (10), communicating a two-part code (60), both the virtual device (70) and the client specific device (20), having a hardware reconfigurable part (80) (40) respectively.
Figure 2:
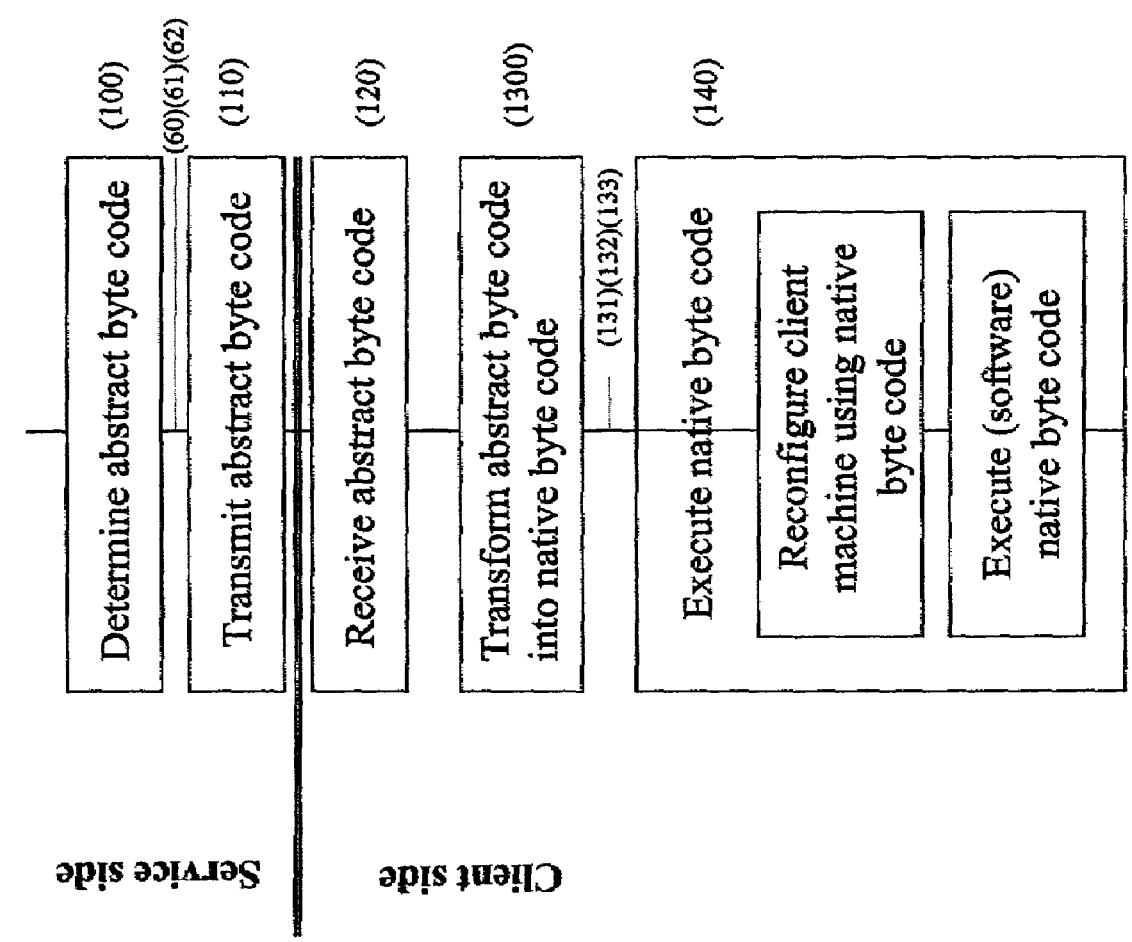
FIG. 2 shows a flowchart, which part of the instructions located at the service side, in particular the construction of to be transmitted code, by mapping on a virtual device and part of the instructions located at the client peer, for executing the application, said part including transforming received code, reconfiguring and finally executing.

The invention relates to methods and apparatus suitable for executing a service or application at a client peer or client side (10), having a client specific device or client specific platform (20), with a reconfigurable architecture, said service or application being provided from a service peer or a service side (30). Said methods and apparatus are such that the amount of specific descriptions, available at the service peer, can be kept small in comparison with the large diversity, including their reconfigurability capacity, of devices, having at least a reconfigurable part (40) found, when considering a plurality of client peers. With a service or an application is meant a program, executable on a device and possibly some associated content files. The service is characterized in that it contains computational intensive functions, preferably mapped on hardware, if available and computational non or less intensive functions, which are preferably mapped on software, executed on the programmable part (50) of said device. Note that with reconfigurability is meant throughout the description hardware reconfigurability.

The invention deals with a method for performing or executing at at least one client peer or side (10), having a client specific device or platform (20) an application or a service (200), provided from a service peer/side (30). Said client specific device or platform (20) is at least partly reconfigurable. Instead of transmitting client specific application or service descriptions from said service peer to said client peer, an abstract bytecode or service bytecode, describing said application in a substantially platform independent way and determined at said service peer (100), is transmitted (110), possibly after some further encoding, into said client peer. At said client peer said abstract bytecode is received (120) and the received abstract bytecode, possibly after some decoding, is converted or transformed (130) into native or client specific bytecode. Said native bytecode is thereafter executed (140).

Said abstract bytecode describes said application in a substantially platform independent way as it determined from performing a compilation of said application on a virtual device (70), also at least partly reconfigurable, hence it has a reconfigurable part (80) and being representative for a class of devices. Hence said virtual device is a generic description for the devices (20) (21) used by different clients, said devices being different, for instance in the size of their reconfigurable part. Said virtual device has further a programmable part (90).

Said abstract bytecode can be understood as code containing abstract instructions, being executable on said virtual device. Executable must be understood here in a broad sense, meaning it contains instructions, executable on the virtual device but also configuration information for the reconfigurable part of said virtual device. Said transformation of said abstract bytecode is capable of transforming said abstract instructions into instructions for said client specific device being with the class of device, generically described by said virtual device. Again executing native bytecode on said client specific device includes reconfiguring.

Said virtual device is a single virtual hardware and software platform or a virtual reconfigurable architecture, being representative for a variety of fixed hardware, such as processors, together defining the software platform part of the virtual device, and further being representative for a variety of reconfigurable hardware, such as field programmable gate arrays, together defining the hardware platform part of the virtual device. The invention generates a single service description, denoted an abstract bytecode or service bytecode. The principle is to create a write once application code.

Due to the dedicated design requirement, resulting in separating the application or service in computational intensive (210) and less intensive (220) functions, results in a co-design context, wherein part of the application's functions are mapped into hardware and the remainder is mapped into software.

Hence the abstract bytecode (60) therefore contains abstract hardware bytecode (61). This abstract hardware bytecode contains information concerning the configuration of the reconfigurable hardware of the virtual device, whereon said computation intensive parts are executed. Further the abstract bytecode contains abstract software bytecode (62), describing the functions being assigned for execution on fixed hardware of said virtual device.

The same co-design context appears at the client peer. Hence the native or client specific bytecode (131) therefore contains native hardware bytecode (132). This native hardware bytecode contains information concerning the configuration of the reconfigurable hardware, but now of the client specific device, whereon said computation intensive parts are executed. Further the native bytecode contains native software bytecode (133), describing the functions being assigned for execution on fixed hardware, but now on the client specific device.

At the client side the received abstract bytecode (60) is transformed into native or client specific bytecode (131) by a transformation step (130) by a so-called virtual machine, being software, executable at said client side. The transformation process is re-using the information within said abstract bytecode. The abstract hardware bytecode is transformed into native hardware bytecode. The abstract software bytecode is transformed into native software bytecode.

In a first embodiment of the invention the abstraction level of the communication between the client peer and the service peer is at RTL register transfer level, is presented. The reconfigurable part of the virtual device is described by a register transfer level description. Said description becomes part of the abstract bytecode, more in particular the abstract hardware bytecode.

In a further embodiment thereof said register transfer level description describes the datapath of the virtual device as a netlist of register transfer level datapath cores. Further said description contains microcode describing a controller.

The step of compiling said application or service on said virtual device generates said register transfer level description.

In a further embodiment thereof the step of transforming said abstract bytecode comprises the step of selecting a physical core implementation for the datapath cores within said datapath description and generating connections between said selected datapath core implementations from said netlist within said datapath description, thereby generating routing information for the reconfigurable part of the client specific device. Said datapath description of said virtual device provides a logic view for a plurality of physical core implementations of which at least one matches with a core implementation for said client specific device with the constraint that said datapath description and each of said (physical) core implementations have the same interface, meaning the same inputs and outputs. Hence said datapath description of said virtual device represents a variety of different client specific devices.

In a second embodiment of the invention the abstraction level of the communication between the client peer and the service peer is at logic level. One can describe both the virtual device its reconfigurable part and the client specific device its reconfigurable part as a collection of logic blocks, being abstract logic blocks at the service side and local logic blocks at the client side, said blocks having input and output ports. The routing of said blocks, defined by the routing architecture, is done with channel segments, organized in a coordinate system in which coordinates can be assigned to each of said channel segments. A connection of two ports of two logic blocks is denoted a net or a path. A net comprises of a combination of channel segments. The routing information at the service side, denoted abstract routing information, comprises the information how the nets between the abstract logic blocks are formed while the routing at the client side, denoted the local routing information, comprises similar information but for the local logic blocks. Hence said reconfigurable part of said virtual device comprises of or is modeled as a plurality of abstract logic blocks and an abstract routing architecture, comprising of channel segments, for connecting part of said abstract logic blocks. Said step of performing a compilation of said application or service on said virtual device generates abstract routing information, indicating in an abstract coordinate system, which channel segments are used for connecting ports of said abstract logic blocks, said abstract routing information being part of said abstract bytecode/service bytecode.

In a further embodiment thereof said step of transforming said abstract bytecode into native bytecode, comprises the step of mapping said abstract logic block into said local logic blocks, by combining said abstract logic blocks, also denoted logic block rebinding, and the step of transforming the abstract routing information, determined for said abstract coordinate system, into local routing information, representing said abstract routing information in a local coordinate system, wherein is indicated which channel segments are used for connecting ports of said local logic blocks, thereby using a coordinate transformation, conversion, resulting in coordinate adjustments.

In a third embodiment of the invention the use of software means at said client side for generating bitstreams for reconfiguring said reconfigurable part of said client side specific device is presented. So instead of transmitting reconfiguration bitstreams as such from the service side to the client side, a description for generating an application programming interface, enabling accessing and generating bitstreams for reconfiguring, is carried throughout said abstract bytecode. Hence the step of transforming said abstract bytecode into native bytecode, comprises the step of generating an application specific interface description, generating bitstreams for reconfiguring said reconfigurable part of said client side specific device. When executing said application a compilation of at least said application programming interface description is performed, followed by executing said compiled application programming interface description, thereby generating said bitstreams for reconfiguring said reconfigurable part of said client side specific device.

In fourth embodiment of the invention it is recognized that the application designer preferably designs with a single, hence virtual hardware/software, interface in mind. The single service description or abstract bytecode comprises besides abstract hardware bytecode, for instance related to the FPGA hardware part, and abstract software bytecode, for instance a Java software part, further an abstract interface or virtual hardware/software interface. Said interface comprises a virtual hardware interface and a virtual software interface. The client specific device has a local hardware/software interface. The application only communications to said virtual interfaces, meaning the hardware with the virtual hardware interface, the software with the virtual software interface, said virtual hardware and software interface, communicating with said local hardware/software interface while executing said application.

Figure 3:
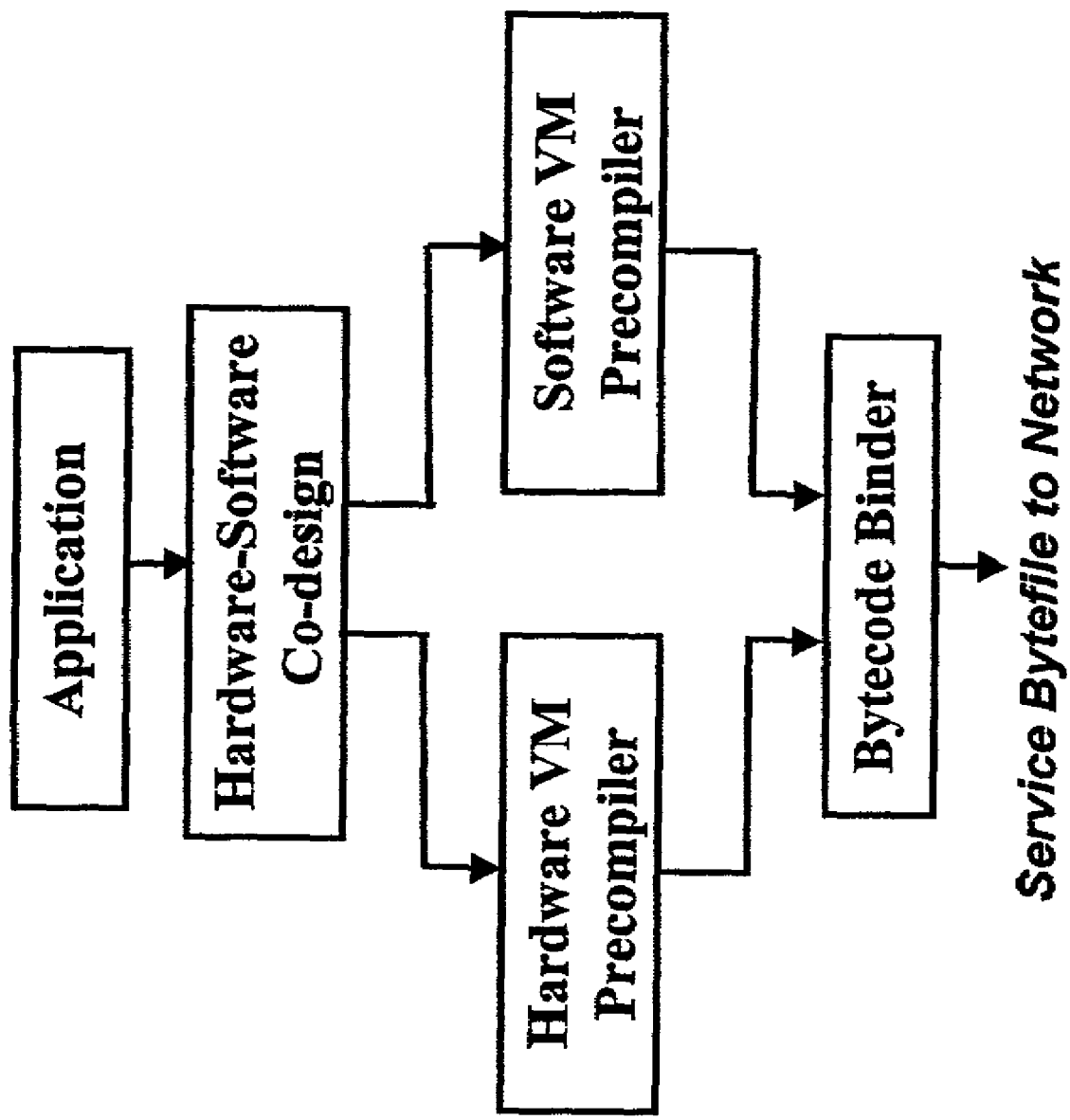
FIG. 3 illustrates part of the instructions at the service side, more in particular the duality between the software design and the hardwared design in a co-design context, wherein the special feature of a hardware virtual machine precompiler is situated.
Figure 4:
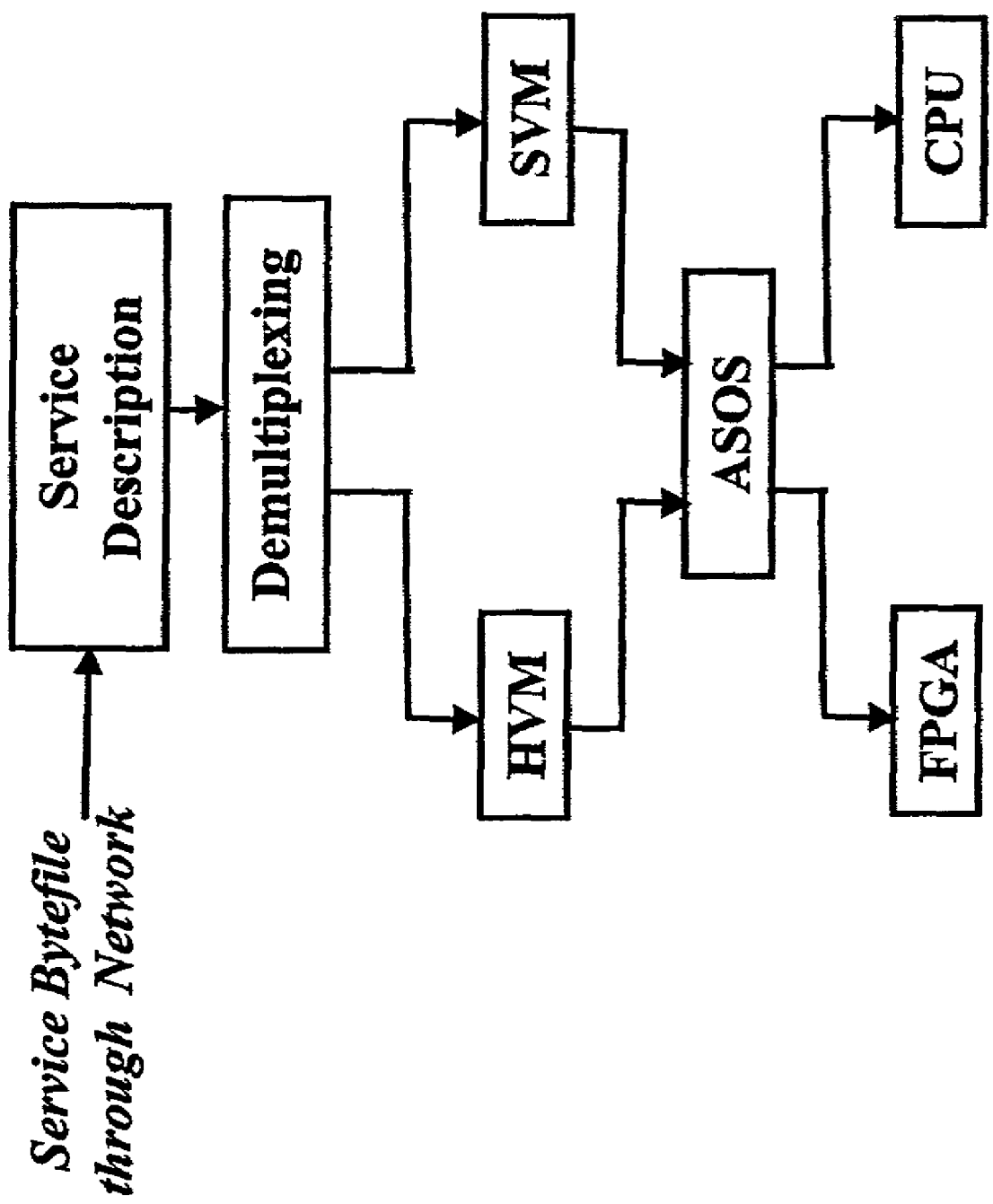
FIG. 4 illustrates part of the instructions at the client side, more in particular the duality between the treatment of the software and hardware code, wherein the special feature of a hardware virtual machine, used for interpreting hardware code, is located.

Within the overall method for executing at at least one client peer an application, provided from a service peer, a design flow at on the Service Provider Side and on the Client Side, can be distinguished as shown in FIGS. 3 and 4.

Figure 5:
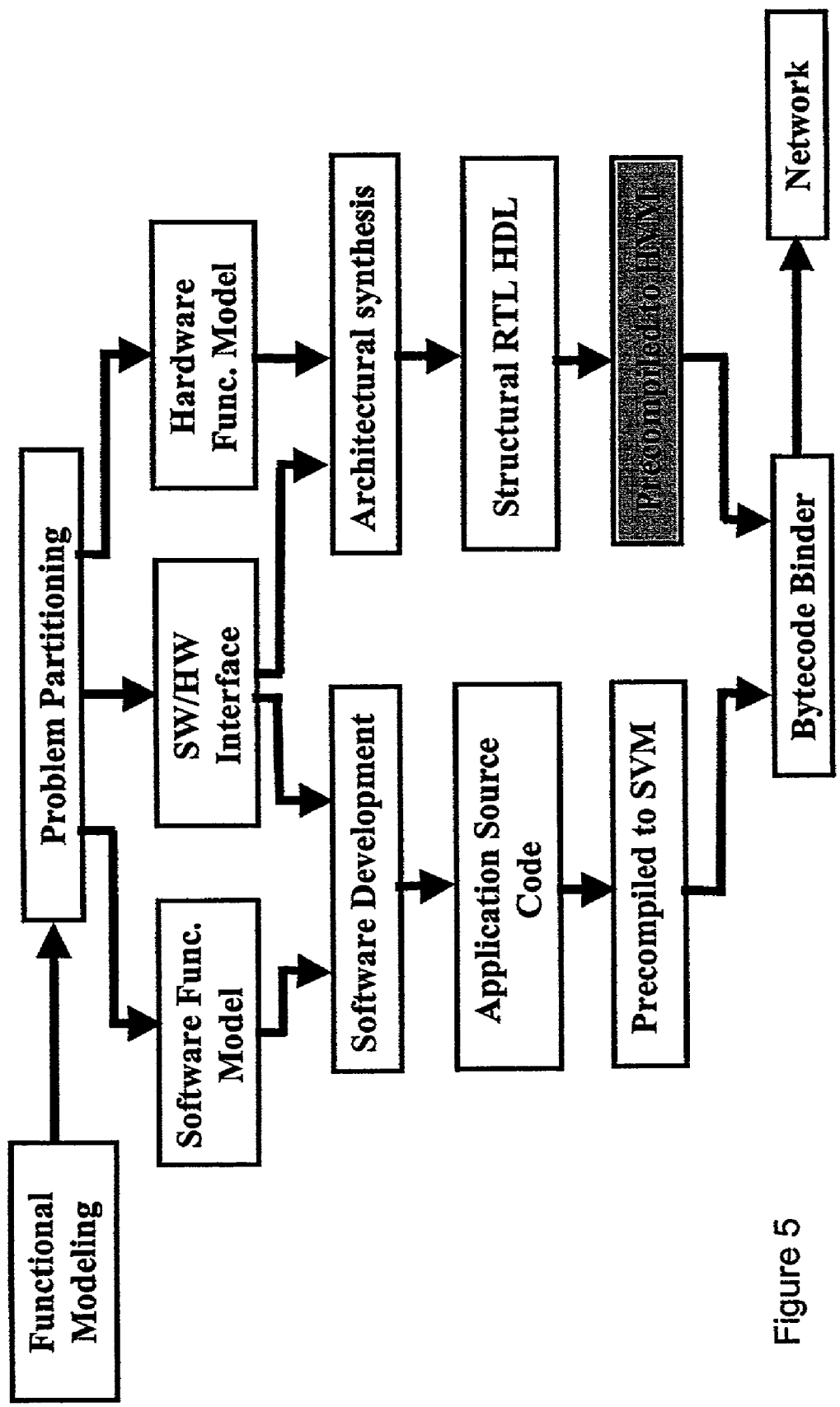
FIG. 5 provides a more detailed service side view, wherein the use of register-transfer level descriptions, according to the first embodiment of the invention, is illustrated FIG. 6 provides a more detailed client side view, wherein the use of a special FPGA interface, for generating bitstreams, according to the third embodiment of the invention is shown.

In an embodiment of the invention at service provider side, shown in FIGS. 3 and 5, as the first stage, the service or application is represented by a functional model. This functional model will be partitioned into three sub-models in a hardware/software codesign environment, typically the partitioning with relate to the computational and non-computational intensive functions of the service. One sub-model describes the application software part. Another describes the application hardware part. The third describes the interface between the partitioned hardware and software sub-models. This interface sub-model contains both a software part and a hardware part. The software sub-model and the software part of interface go through various phases of software development, which generates the detailed source code to implement the two sub-models. The detailed source code is then precompiled into software bytecode by a software virtual machine precompiler. The hardware sub-model and the hardware part of interface are fed into a hardware design environment. After behavioral synthesis, the sub model for the hardware will be transformed into a structural register transfer level (RTL) hardware description. The hardware bytecode can be obtained by floorplanning this netlist on the abstract FPGA model. Both hardware and software bytecodes are sent to the service bytecode binder, which produces the combined service bytefiles. The hardware design environment can be depicted as a hardware virtual machine precompiler, generating abstract hardware bytecode.

Figure 6:
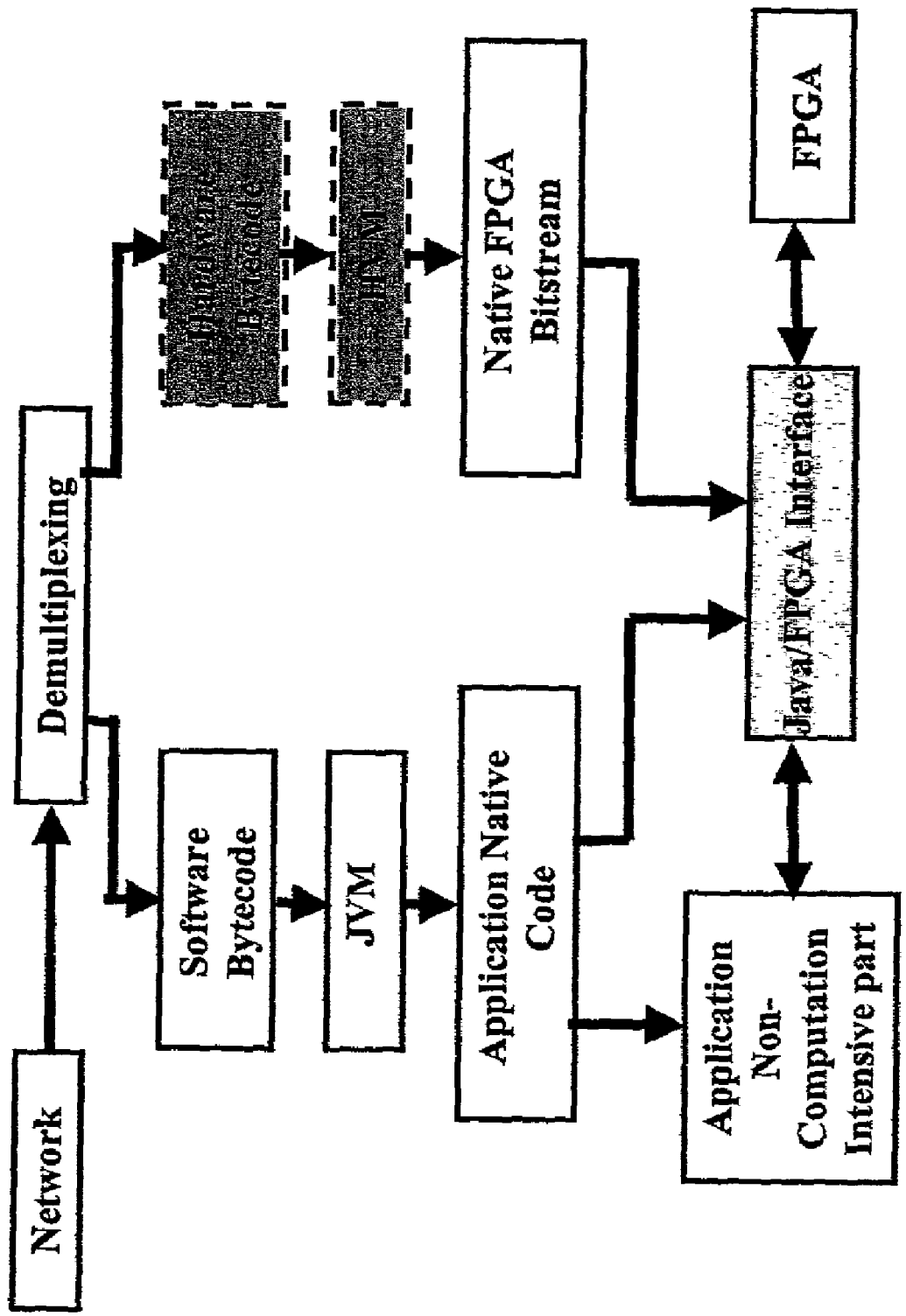

In an embodiment of the invention at the client side, shown in FIGS. 4 and 6, the received service bytefile is first demultiplexed to software and hardware bytecode respectively. Software bytecode is interpreted by the software virtual machine and turned into native application software code that runs on the native CPU via the application specific operating system (ASOS). On the other hand, the hardware bytecode is interpreted by the hardware virtual machine (HVM), and turned into native FPGA bitstreams that will configure the native FPGA. A HW/SW interface will first be defined via the virtual interface API calls. Through this defined interface, native FPGA bitstreams will be sent to the FPGA for reconfiguration. The reconfigured FPGA can then be used as a hardware accelerator. The native application software code interacts with the FPGA accelerator through the virtual interface.

The invention provides a method wherein the FPGA mapping is separated over the service and client side. Indeed for FPGA design flow for networked hardware reconfiguration, there are three options for locating the FPGA mapping tools. Firstly, the mapping tools can be totally put on the service provider side. This approach is easy to implement in theory, but very troublesome in maintenance as several mappings must be provided as the clients have a variety of different devices. As a second choice, the mapping tools can be totally put in the client's side. It is an easy way both for implementation and maintenance from the point of view of the service provider, but too expensive for the terminals. Finally, as a third choice, as provided by the invented method, mapping tools can be separated into two parts, partially on the service provider side, and partially on the client side. Let us define the map at client side block as hardware virtual machine (HVM), while the map at service side block as HVM-compiler. As benefits of this approach, service providers only need to maintain a single or few FPGA CAD tools to distribute and update their new services, while at the same time, the client does a reasonable portion of the mapping task. Essential for the invention is that the mapping effort spend at the service side, which is substantially client independent, can be substantially re-used while mapping at the client side, wherein client specific aspects are taken into account.

One can state that the invention can be formalized as a method for executing applications on hardware reconfigurable devices, by determining a first code by compilation of said application on a virtual device, being at least partly hardware reconfigurable, transmitting said first code to said client, transforming at said client peer said received first code into second code, and reconfiguring said client specific device by exploiting part of said second code; and executing said application at said client peer on said client specific device, by exploiting part of said second code. Said compilation provides information on how said virtual device must be hardware reconfigured for executing said application. Said step of transforming is less demanding, in terms of mapping effort, than directly determining information from said application on how said client specific device must be hardware reconfigured for executing said application, hence there is a benefit at the client side when one exploits said first code. On the other hand the service side has as advantage that once can concentrate on designing for a single virtual device instead of taking into account client specific issues. Said virtual device is representative for a set of at least two devices, of which at least said client specific device is part.

Figure 7:
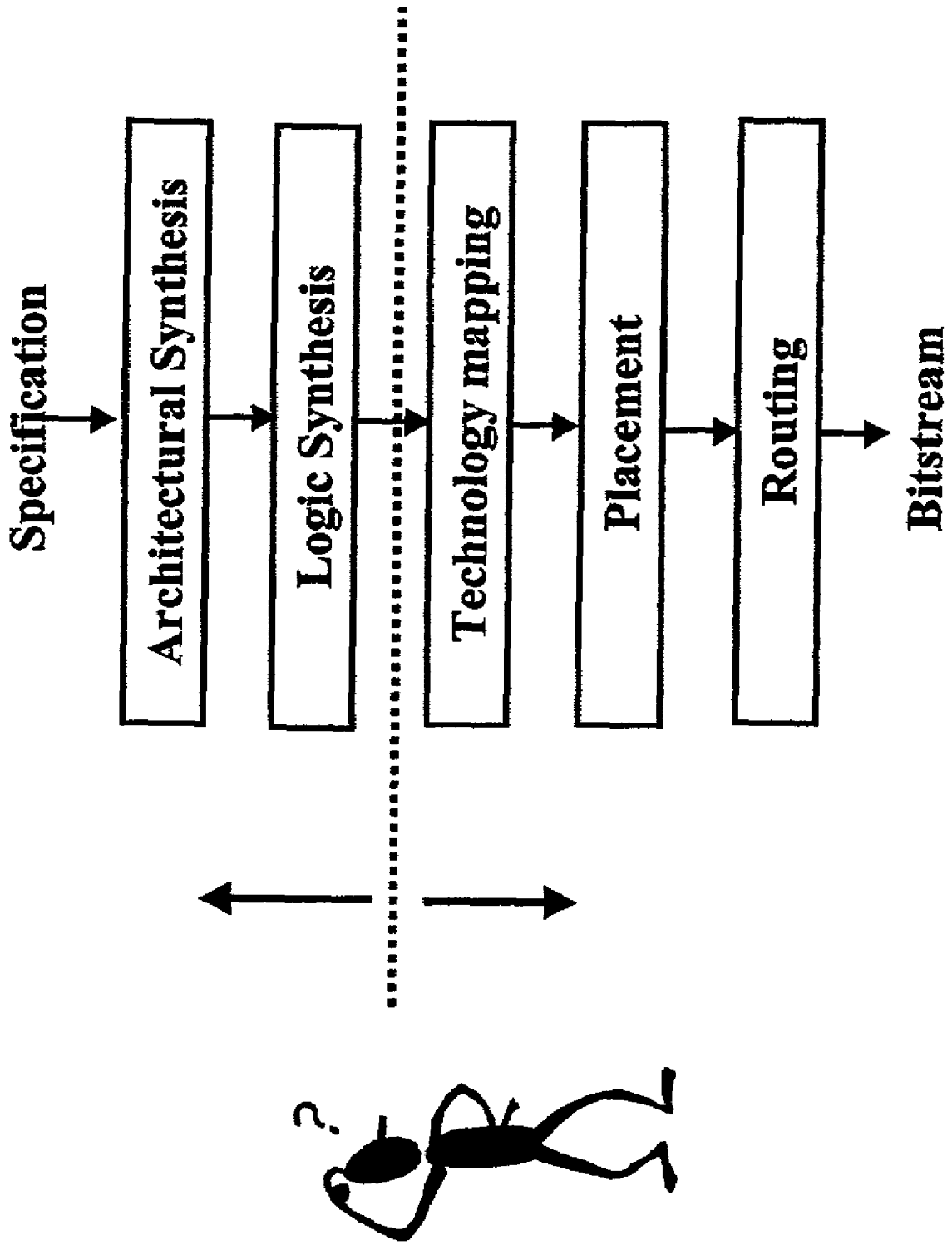
FIG. 7 illustrates the issue of choosing the abstraction level for the hardware virtual compiler and hardware virtual machine, being either at the logic level, so after logic synthesis or at a higher abstraction level, being before logic synthesis, such at register transfer level.

Once we decide to use the HVM approach for the service deployment, the next question is at which level should the HVM separate the design flow. A traditional FPGA design flow is shown in FIG. 7. By separating the design flow at different levels, different HVMs can be obtained. The level that a HVM belongs to is mainly depended on the level of abstract FPGA model that the HVM used. On the server side, each design will first be mapped on a abstract FPGA model, and then interpreted by its corresponding HVM on the client side. In the invention two different level abstract FPGA models in the next two paragraphs will be introduced but the invention is not limited thereto.

Figure 8:
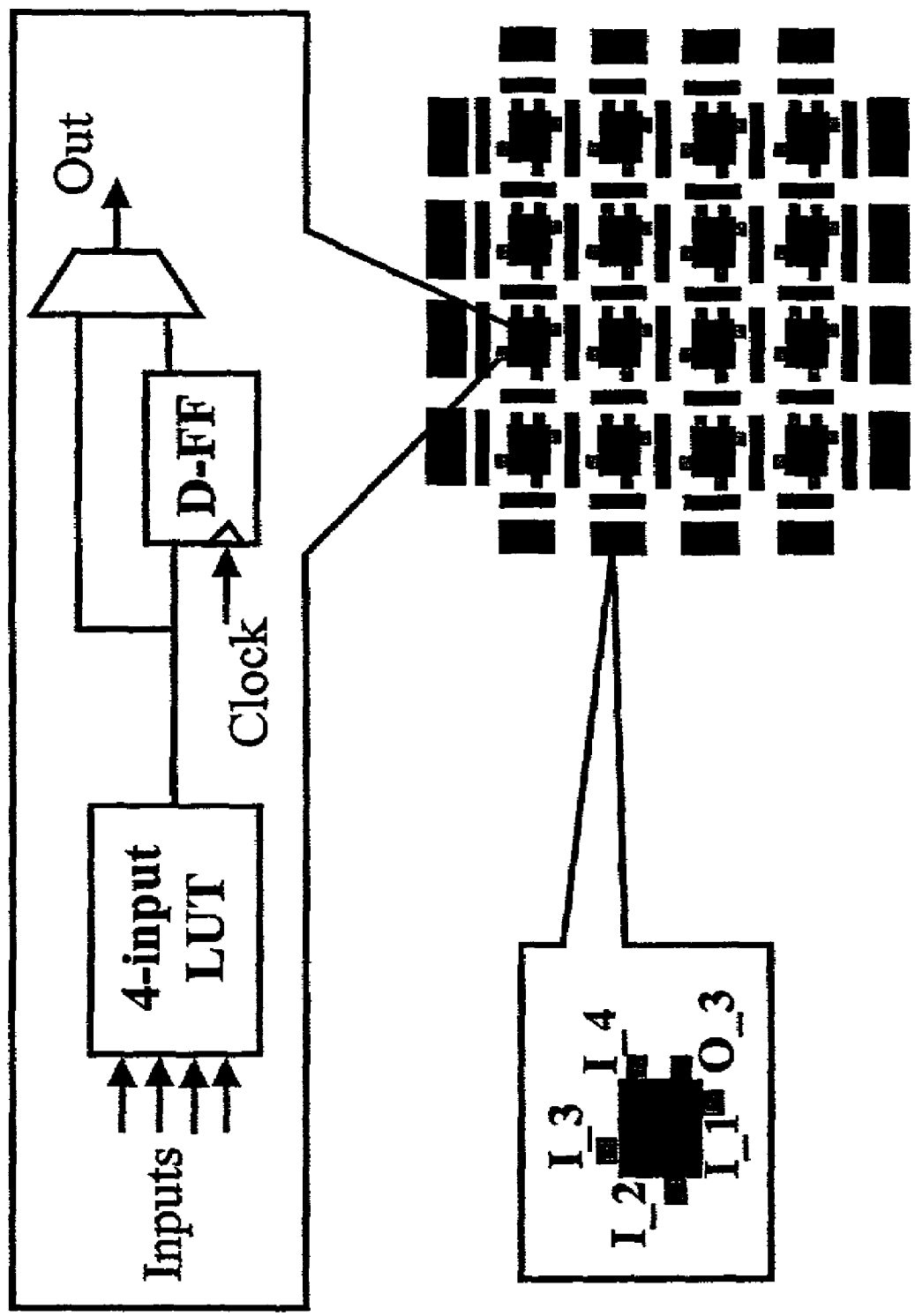
FIG. 8 shows a logic level hardware machine model.
Figure 9:
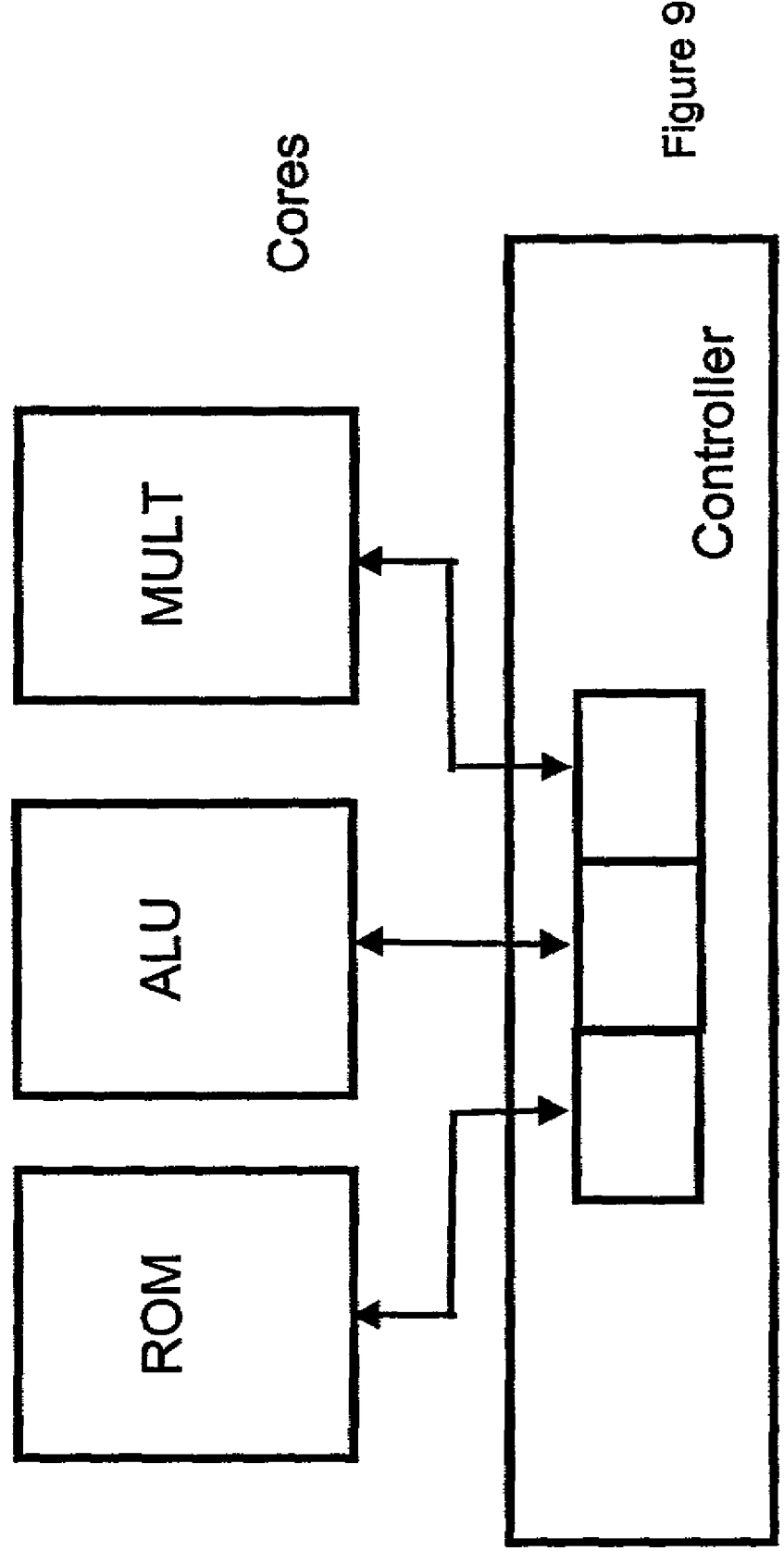
FIG. 9 shows a register transfer level hardware machine model.

FIG. 8 shows a logic level abstract FPGA model. Corresponding to commercial FPGAs, the abstract logic level FPGA model also contains three blocks. They are abstract logic block, abstract routing architecture, and abstract I/O pads. Applications are first mapped and pre-placed and routed onto this abstract FPGA architecture. Then on the client side, the pre-placed and routed bytecode will be converted into local bitstream. FIG. 9 shows a register transfer level abstract FPGA model. It consists of two parts: datapath and controller. The datapath is composed of different RTL level cores, e.g. ALU, ACU, multiplier, adder. The controller is based on microcode. Architectural synthesis tools will be used to generate the RTL level structural VHDL netlist from the high level specification. In this structural VHDL netlist, the datapath is described by a netlist of datapath cores, while the controller is described by microcode, allowing for a flexible RAM implementation. From the bytecode size point of view, the RTL HVM bytecode size is much smaller than that of the logic level HVM, since less design information is contained at the RTL-level. The logic level bytecodes size normally are in the magnitude of MBits, whereas the RTL-level bytecodes are of the order of KBits. Besides, the RTL HVM enables those architectural specific features like carry chain to be used in its library cores, while logic level HVM does not. Moreover, because there are less net connections in the RTL-level than in the logic level, the run time interpretation of RTL HVM is much faster than that of the logic level HVM.

Figure 10:
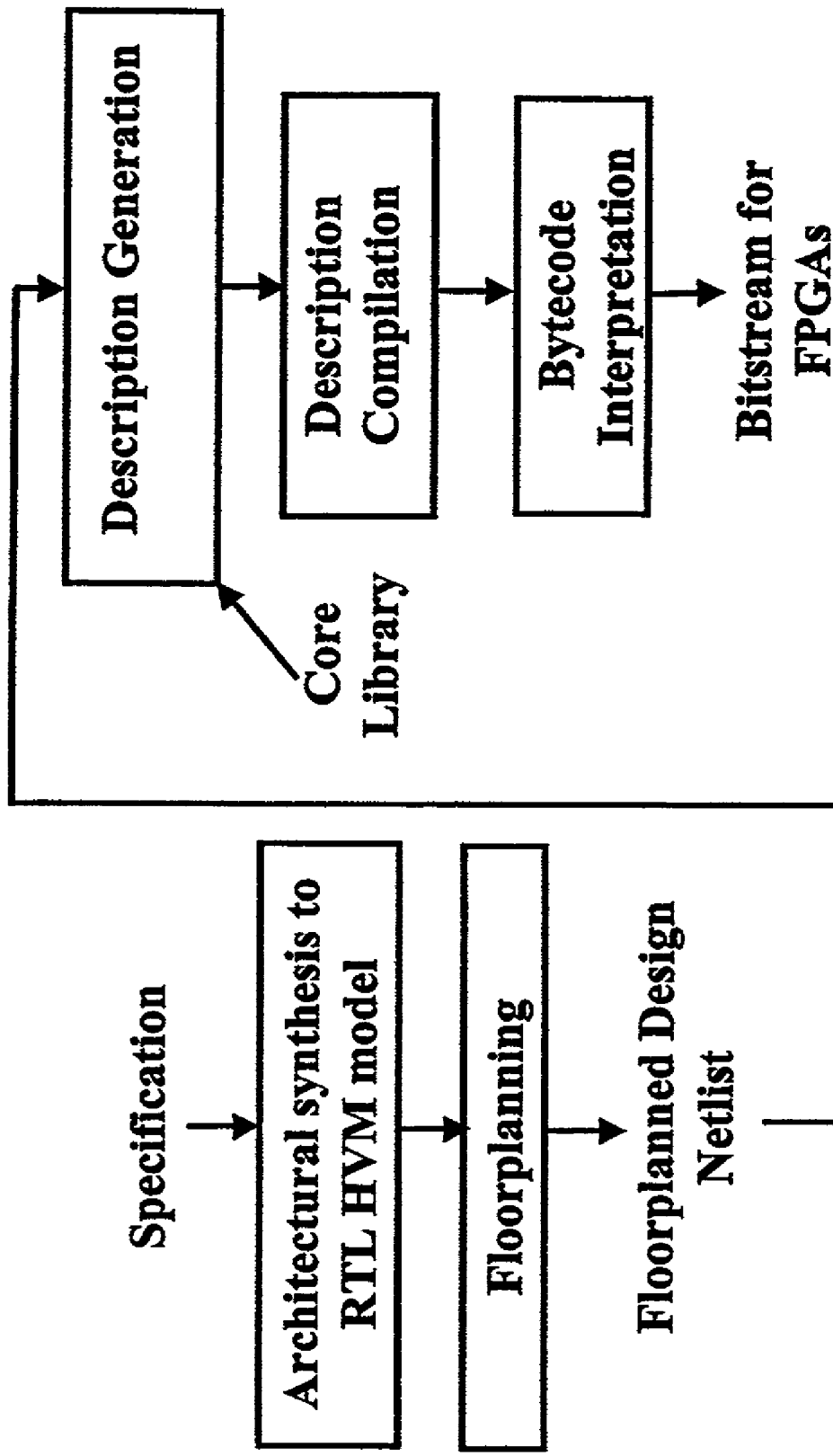
FIG. 10 shows the implementation flow for a register transfer level approach, wherein it is shown that a floor-planned design netlist, is transmitted in the code exchange between service and client. Further the use of a software description generation of an application specific programming interface, at the client side, is shown.

In an embodiment of the invention a RTL HVM machine implementation is disclosed. In the hardware virtual machine implementation, a set of software objects, which provide an Application Programming Interface (API), are used, said API is used for accessing the FPGA bitstream. The interface can be used to construct complete circuits and to modify existing circuits. In addition, object-oriented support in the programming language, for instance the use of a small library of parameterizable, object oriented macro circuits or cores to be implemented, is used. There is also a run-time router used to provide an API for run-time routing of FPGA devices. FIG. 10 shows an implementation flow for the register transfer level hardware virtual machine according to an embodiment of the invention. The circuit to be implemented is first processed to be described by a combination of datapaths and microcode-based controllers with architectural synthesis tools. Both datapaths and controllers are considered as cores which can be abstractly described on the server side. The real implementations of those cores are provided in the core library on the client side. On the client side, the hardware virtual machine maps each macro-netlist item into a module call. The floorplan and platform dependent information are used in the mapping process. After that, the platform independent macro-netlist is translated into a specific program, which can finally create the FPGA specific bitstream. Note that FPGA's are examples of reconfigurable hardware but the invention is not limited thereto.

Figure 11:
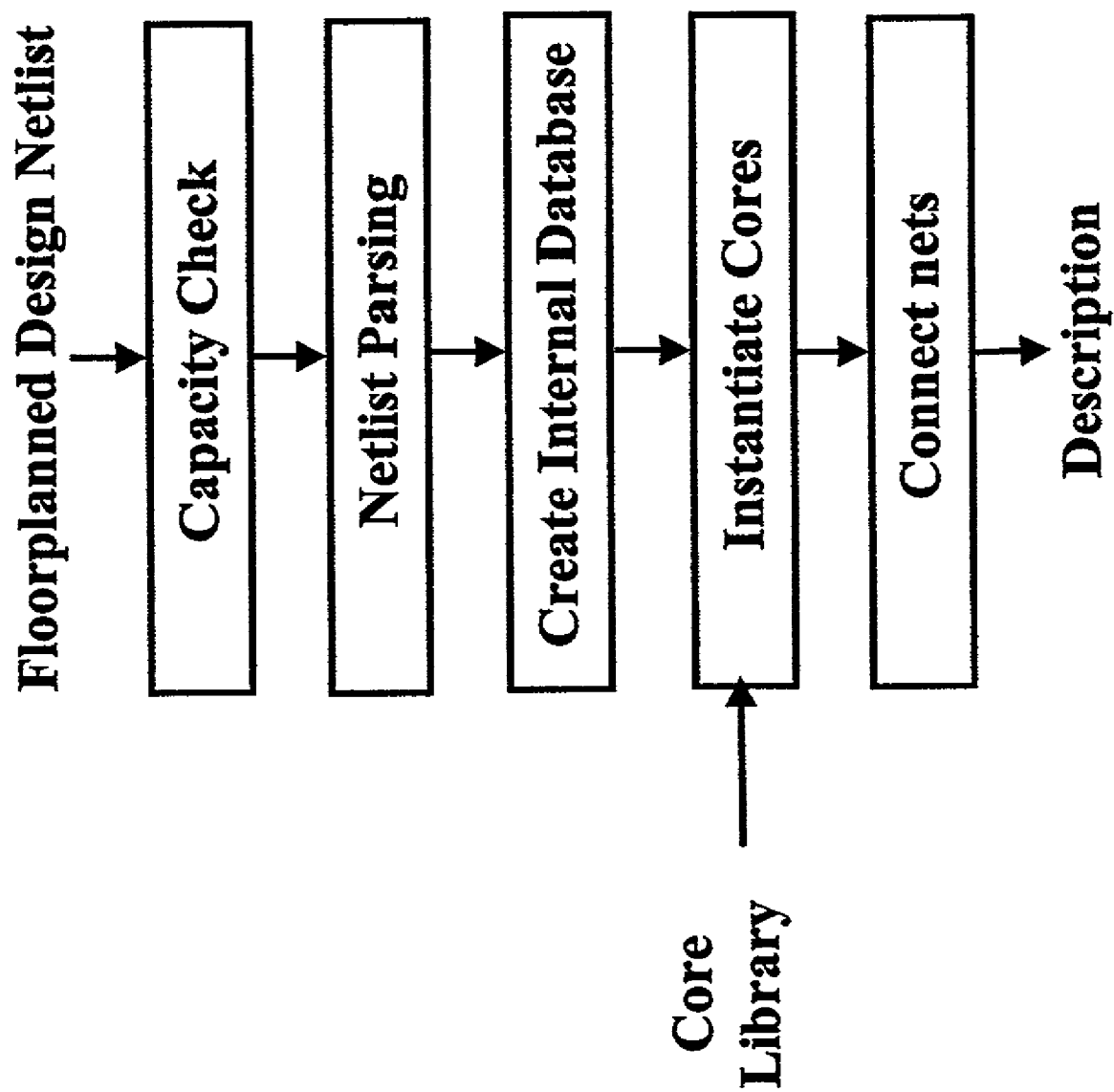
FIG. 11 details the API description generation.

The central task of the hardware virtual machine is to interpret the hardware bytecode. In an embodiment of the invention an approach using an application specific programming interface is disclosed. In said approach said central task include the generating of a description of said application specific programming interface. As shown in FIG. 11 this program generation starts from the capacity check of the floorplanned design netlist, which checks that whether the local platform is big enough to accommodate to the application to be downloaded. The second step is to create the internal database by parsing the netlist. This database is based on a core library, where the description for each of the RTL-level cores is stored. From the information in the database, cores are instantiated, and nets between cores are specified. The outcome of those transformation steps is a full description (program) that can be used to generate the final bitstream in seconds. In practice a floor-planned netlist is extracted from the hardware bytecode. When this netlist is fed into hardware virtual machine, a program will be generated. This program will be later compiled by the precompiler and executed by virtual machine to get the bitstream.

One can formalize the invention by stating that the application is represented by functional model. At the service peer a step of performing hardware-software codesign of said application is performed, resulting in at least one functional submodel of the part of the application being implemented in software code and in one functional submodel of the part of the application being implemented in hardware.

In an embodiment of the invention said co-design step comprises compilation/logical synthesis of the gate-level netlist of said part of said application being implemented in hardware, performing a technology mapping of said gate-level netlist to a model of an abstract reconfigurable hardware device, determining physical design information by placement and global routing said technology mapped gate-level netlist on said model of said abstract reconfigurable hardware device and storing said physical design information in said hardware bytecode.

In another embodiment of the invention a logic level HVM implementation is disclosed.

The virtual FPGA model is the bridge between service providers and clients. Both sides (service provider and client) rely on it to produce results. Like in commercial FPGAs, the abstract FPGA model also contains three blocks. They are abstract logic block, abstract routing architecture, and abstract I/O pad. The logic block used in an FPGA influences the FPGA speed and area-efficiency.

While many different logic blocks have been used in FPGAs, most current commercial FPGAs are using logic blocks based on look-up tables (LUTs). Accordingly, for the logic level embodiment here only abstract logic blocks for those LUT-based FPGAs are used but the invention is not limited thereto. One abstract basic logic block is shown in FIG. 4. It contains a K-input LUT (we choose K=4 in the example) to implement combinational logic, a D flip-flop to implement sequential logic, and a multiplexer to choose the output. The pin locations of an abstract logic block are chosen randomly, because they will be mapped to the real pin locations of the client FPGA later.

Figure 14:
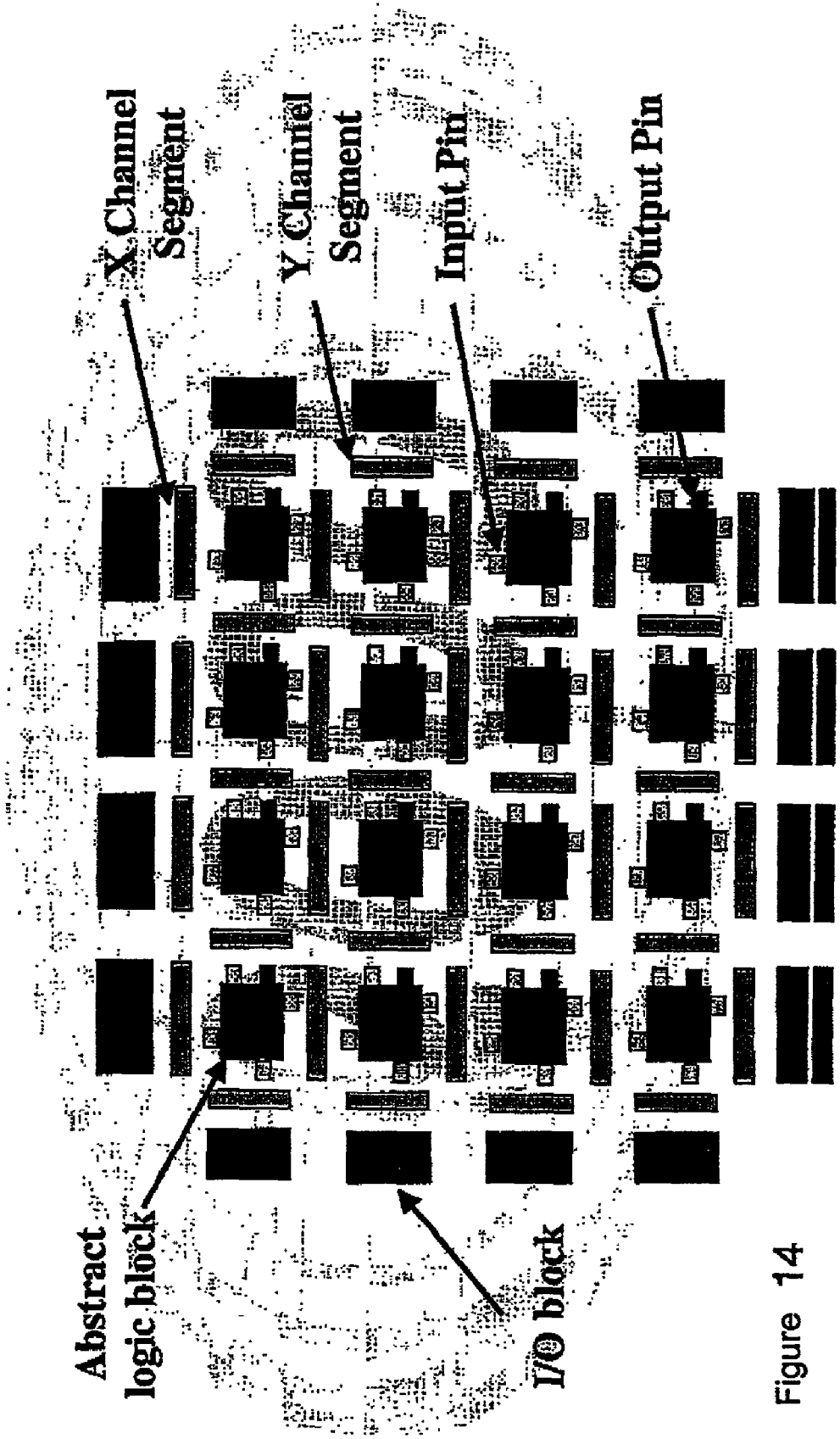
FIG. 14 shows an abstract device model used in the logic level approach.

Combination of abstract basic logic blocks can be used to describe a series of commercial logic blocks. Abstract I/O blocks, in many ways, can be treated as a simpler logic block. It comprises M pads (we choose M=2 in the example) which are programmed to be either input or output pad. Similarly as the pins in an abstract logic block, I/O pad locations can be chosen freely. The position for an abstract logic block or I/O pad is specifically defined in the coordinate system. Based on their routing architecture, commercial FPGAs can be classified into three groups. The FPGAs of Xilinx, Lucent are island-style FPGAs, while Actel's FPGAs are row-based, and Altera's FPGAs are hierarchical. The routing architecture in our abstract FPGA model can describe all of the three groups. It consists of an array of X channel segments and Y channel segments like in FIG. 14. Any path between two pins or one pin and one pad can be abstractly described by the combination of X and Y channel segments. The position for a X or Y channel is specifically defined in the coordinate system. The virtual FPGA model converter fulfills the task of interpreting abstract hardware bytecode into local FPGA programming files, where the hardware bytecode is received from the service provider via the network. The converter partitions its job into a plurality of steps. At first, the converter does the logic block rebinding. The abstract FPGA logic blocks are mapped to the local logic block architecture. Depending on how large the local logic block is, several abstract logic blocks will be combined to make a new big block. The next steps are local routing modification (LRM) for illegal tracks and the coordinate adjustment. In that phase, if the path of a net in the hardware bytefile passes any channel that is illegal after logic block rebinding, it should be modified to use legal channels. When the abstract logic blocks are rebound to make local logic blocks, and illegal tracks have been removed, the coordinate system of the abstract FPGA is converted to that of the local FPGA coordinate system. The routing information is now represented on the local coordinate system. Next, the converter will do pin reassignment and LRM for pins. The pin location for each abstract logic block will be reassigned to map to the real location of the pins of the local FPGAs. Similarly, for the I/O pads, the converter needs to do I/O pad reassignment and LRM for I/O pads. Finally, detailed routing can be done to accurately assign the path of each net to each track.

Figure 12:
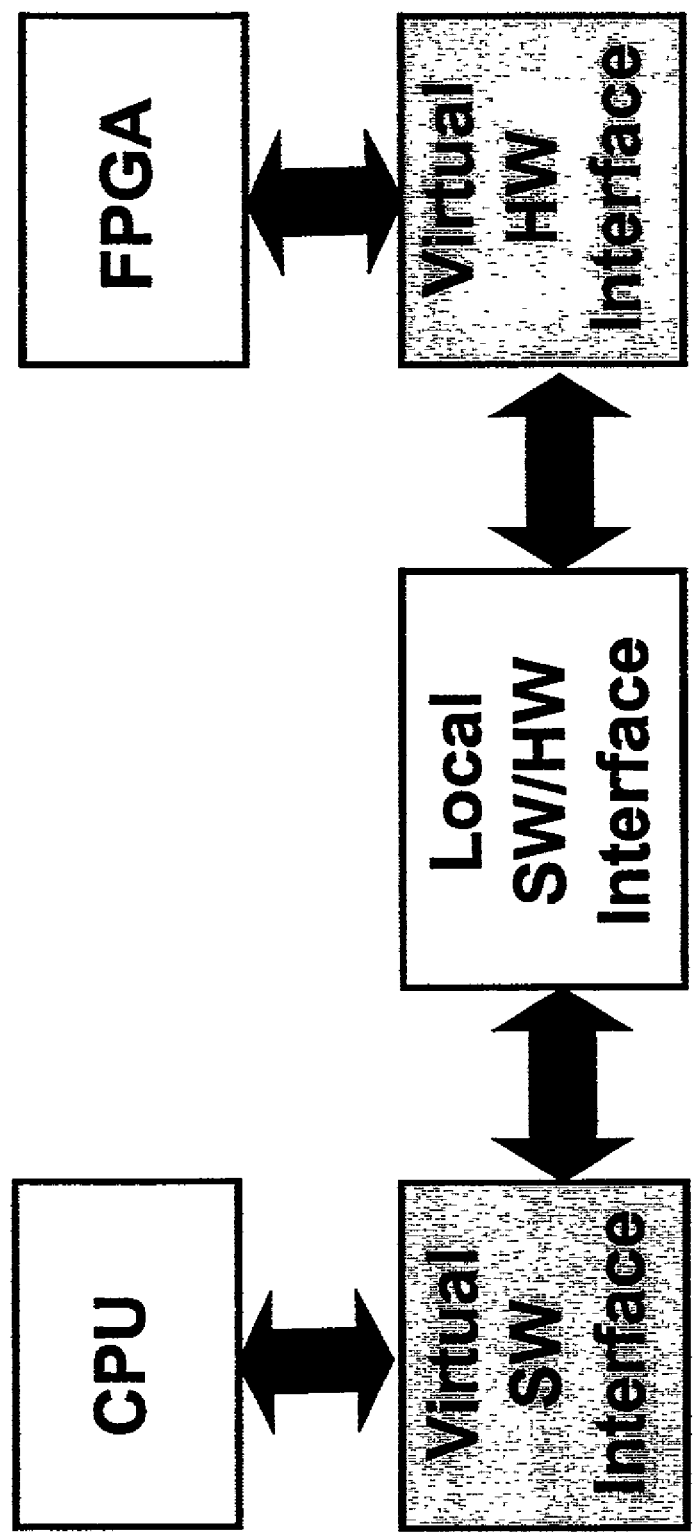
FIG. 12 shows the fourth embodiment of the invention, including the various interface components and the structured interactions therebetween.
Figure 13:
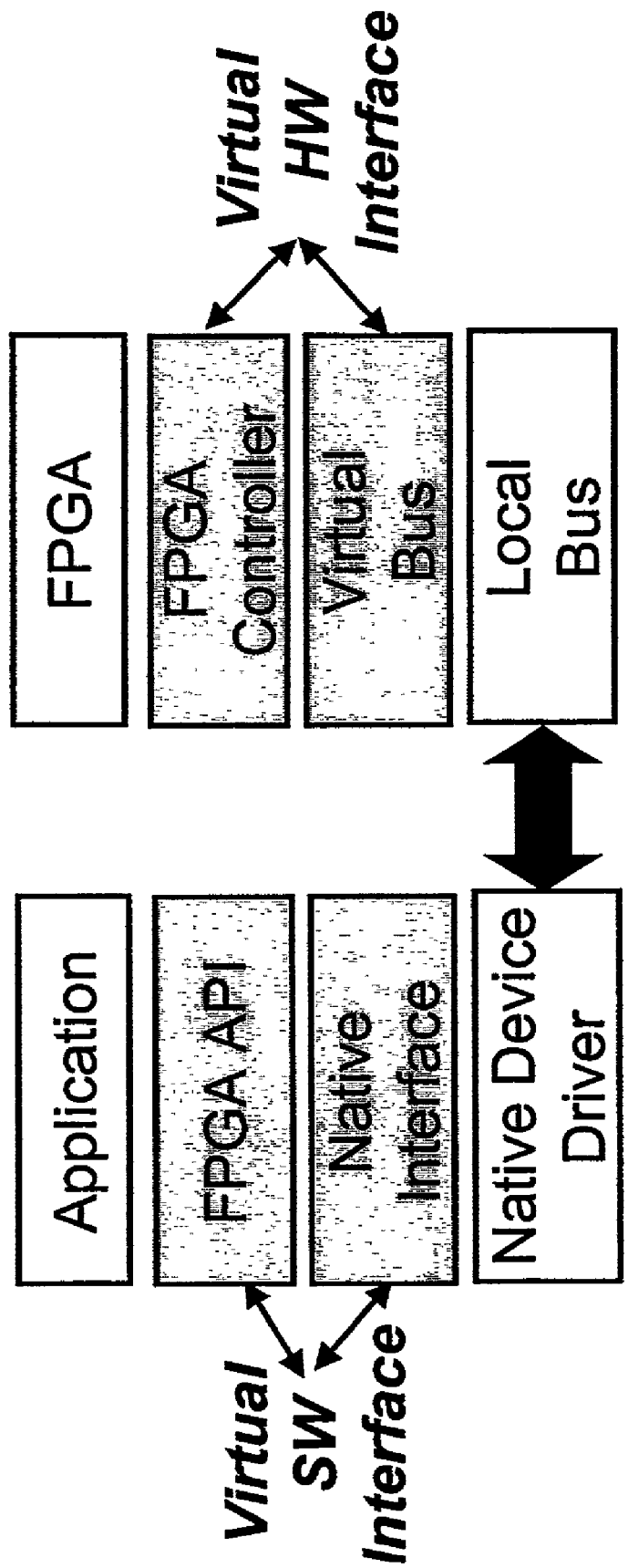
FIG. 13 shows an alternative view on the virtual interface concept.

To enable network application developers design their applications with only one interface in mind when considering the interfacing issues, a platform independent virtual interface as shown in FIG. 12 is disclosed in an embodiment of the invention can be used. The virtual interface has two functions: Firstly it provides platform independent API calls to prepare a configuration interface for the FPGAs to be configured. Secondly it provides platform independent API calls for communication (reading and writing) between the software implemented on CPU and the hardware implemented on FPGA. The virtual interface consists of software and hardware parts. As you can see from FIG. 12, the local HW/SW interface has been isolated by the virtual software and hardware interface respectively. The software only communicates with the virtual software interface, whereas the hardware (FPGA) only communicates with virtual hardware. Nevertheless the real communication is still done through the local SW/HW interface. This solution abstracts as much as possible platform specific details from the application designer, at the expense of some performance sacrifice for the interface. A more detailed high-level overview of the FPGA API implementation is shown in FIG. 13. On the software side, FPGA API and Native Interface constitute the virtual software interface. On the hardware side, virtual bus and FPGA controller constitute the virtual hardware interface.

What is claimed is:

1. A method of transforming bytecode, the method comprising:

determining an abstract bytecode by performing a compilation of an application for execution on a virtual device, wherein the abstract bytecode comprises abstract hardware bytecode and abstract software bytecode;

transmitting the abstract bytecode from a service peer to at least a client peer;

transforming the abstract software bytecode into native software bytecode that is executable on a client specific device;

transforming the abstract hardware bytecode into native hardware bytecode, wherein the native hardware bytecode includes configuration information for the client specific device;

hardware configuring the client specific device using at least in part the hardware native bytecode; and executing the native software bytecode on the client specific device.

2. The method of claim 1, wherein the client specific device comprises a programmable logic device.

3. The method of claim 2, wherein the programmable logic device comprises a field programmable gate array.

4. The method of claim 1, wherein the configurable part of the virtual device is modeled by a register transfer level description.

5. The method of claim 4, wherein the register transfer level description is a description of a datapath that includes a netlist of register transfer level datapath cores and a controller that is described by microcode.

6. The method of claim 5, wherein transforming comprises:

selecting a physical core implementation for the datapath cores within the datapath description; and generating connections between the selected datapath core implementations from the netlist within the datapath description.

7. The method of claim 6, wherein the datapath description provides a logic view for a plurality of physical core implementations, and wherein the datapath description and each of the physical core implementations have the same interface.

8. The method of claim 1, wherein the virtual device comprises abstract logic blocks and an abstract routing architecture that comprises channel segments for connecting part of the abstract logic blocks, the method additionally comprising:

compiling the application and thereby generating abstract routing information; and indicating in an abstract coordinate system, which channel segments are used for connecting ports of the abstract logic blocks, the abstract routing information being part of the abstract bytecode.

9. The method of claim 1, wherein the configurable part of the virtual device comprises abstract logic blocks and an abstract routing architecture that comprises channel segments for connecting part of the abstract logic blocks, wherein the abstract bytecode comprises abstract routing information that indicates in an abstract coordinate system, which channel segments are used for connecting ports of the abstract logic blocks, wherein the configurable part of the client specific device comprises local logic blocks and a local routing architecture for connecting part of the local logic blocks, and wherein transforming the abstract bytecode into native bytecode comprises mapping the abstract logic block into the local logic blocks.

10. The method of claim 1, wherein transforming the abstract bytecode into native bytecode comprises:

generating an application programming interface description; and generating bitstreams for reconfiguring the configurable part of the client specific device.

11. The method of claim 10, wherein executing the application comprises compiling at least the application programming interface description and executing the compiled application programming interface description, thereby generating the bitstreams for reconfiguring the configurable part of the client specific device.

12. The method of claim 1, additionally comprising generating a virtual hardware/software interface that is representative of a class of hardware/software interfaces, the virtual hardware/software interface comprising a virtual hardware interface and virtual software interface.

13. The method of claim 12, wherein executing the application on the client specific device comprises invoking a hardware/software interface, wherein the hardware/software interface comprising a virtual hardware/software interface and a local hardware/software interface that is specific for the client specific device.

14. The method of claim 13, wherein the software bytecode communicates only with the virtual software interface, wherein the virtual software interface communicates with the local hardware/software interface, wherein the client specific device communicates only with the virtual hardware interface, and wherein the virtual hardware interface communicates with the local hardware/software interface.

15. A method of generating an abstract bytecode bytecode, the method comprising:

compiling an application for execution on a virtual device thereby generating abstract bytecode, wherein the abstract bytecode comprises abstract hardware bytecode and abstract software bytecode, wherein the hardware of the virtual device is at least partly configurable, using at least in part a native byte code, and is representative of a class of configurable devices that each includes a configurable client specific device, wherein the abstract hardware bytecode is transformable into native hardware bytecode for at least one of the configurable client specific devices, wherein the abstract byte code is transformable into native software bytecode that is executable on a client specific device, and wherein the native hardware bytecode comprises configuration information for the configurable client specific device.

16. The method of claim 15, wherein the configurable client specific device is modeled at least in part by a register transfer level description.

17. A method of executing at least one client peer, having a client specific device, the method comprising:

receiving, at the client peer, abstract hardware bytecode wherein the abstract hardware bytecode contains abstract configuration information for a virtual device that is functionally representative of a class of devices, of which at least the client specific device is part;

receiving, at the client peer, abstract software bytecode;

transforming, at the client peer, the abstract hardware bytecode into native hardware bytecode for the client specific device, wherein the abstract configuration information is transformed into native hardware configuration information;

transforming, at the client peer, the abstract software bytecode into native software bytecode;

hardware configuring the client specific device using at least in part the native configuration information; and executing the software native bytecode at the client peer.

18. The method of claim 17, wherein the abstract bytecode comprises abstract hardware bytecode that is transformable into native hardware bytecode that includes configuration information for the client specific device.

19. The method of claim 17, wherein executing the native bytecode comprises configuring the configurable part of the client specific device, based on the native hardware bytecode.

20. The method of claim 17, wherein the configurable part of the virtual device is modeled by a register transfer level description.

21. The method of claim 17, wherein transforming the abstract bytecode into native bytecode, comprises:
generating an application programming interface description; and
generating and accessing bitstreams for reconfiguring the configurable part of the client specific device.

22. The method of claim 20, wherein executing the native bytecode comprises:
compiling at least the application programming interface description; and
executing at least the compiled application programming interface description thereby generating the bitstreams for reconfiguring the configurable part of the client specific device.

23. A program storage device readable by a client specific device, tangibly embodying a program of instructions executable by the client specific device, to perform steps for executing an application on the client specific device, the method comprising:
transforming an abstract hardware bytecode obtained by compilation of the application for execution on a virtual device that is at least partly hardware configurable and is representative of a class of devices, of which at least the client specific device is part, into native hardware bytecode that is partly executable on the client specific device and that is partly used for configuring the client specific device; and
transforming an abstract software bytecode into native software bytecode that is executable on the configured client specific device.

24. The program storage device of claim 23, wherein the abstract bytecode contains a register-transfer level description.

25. The program storage device of claim 23, wherein the method further comprises:
generating an application programming interface; and
compiling the application programming interface and executing at least the application programming interface, to thereby generate bitstreams for reconfiguring the configurable part of the client specific device.

26. A client specific device for executing an application, provided from a service peer, the device comprises:
a configurable hardware part;
means for receiving abstract hardware bytecode, being obtainable by compilation of the application for execution on a virtual device that is at least partly hardware configurable, wherein the virtual device is representative for a class of devices, of which at least the client specific device is part, wherein the configurable part of the virtual device being modeled by a register transfer level description;
means for transforming the abstract hardware bytecode into native hardware bytecode for the client specific device;
means for executing the application/service at the client peer on the client specific device, being part of the class of devices and being at least partly configurable by exploiting the native hardware bytecode; and
means for transforming an abstract software bytecode into native software bytecode that is executale on the configured client specific device.

* * * * *

UNITED STATES PATENT AND TRADEMARK OFFICE
CERTIFICATE OF CORRECTION

| | | |
|---|---|---|
| PATENT NO. | : 7,150,011 B2 | Page 1 of 1 |
| APPLICATION NO. | : 09/886533 | |
| DATED | : December 12, 2006 | |
| INVENTOR(S) | : Ha et al. | |

It is certified that error appears in the above-identified patent and that said Letters Patent is hereby corrected as shown below:

In column 1, Title page, line 2 Item [75], please delete "Wijgmaal" and insert -- Mariakerke --, therefor.

In column 2, line 51, after "bytecode" delete "bytecode".

In column 2, line 53, before "being" delete "bytecode".

In column 14, lines 23-24 in Claim 15, after "bytecode" delete "bytecode".

In column 16, line 34 in Claim 26, delete "executale" and insert -- executable --, therefor.

Signed and Sealed this

First Day of May, 2007

JON W. DUDAS
*Director of the United States Patent and Trademark Office*